(12) United States Patent
Zhong et al.

(10) Patent No.: US 6,410,104 B1
(45) Date of Patent: **\*Jun. 25, 2002**

(54) ELECTROLESS NICKEL-PHOSPHOROUS COATINGS WITH HIGH THERMAL STABILITY

(75) Inventors: Linda L. Zhong, Fremont; Connie C. Liu, San Jose; Jeff D. St. John, Los Gatos, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/489,935

(22) Filed: Jan. 24, 2000

Related U.S. Application Data

(63) Continuation-in-part of application No. 09/122,761, filed on Jul. 27, 1998, now Pat. No. 6,106,927.
(60) Provisional application No. 60/129,308, filed on Apr. 14, 1999.

(51) Int. Cl.$^7$ .............................. B05D 5/12; B05D 3/06; B05D 3/10; B05D 1/18; B05D 1/36
(52) U.S. Cl. ...................... 427/554; 427/130; 427/131; 427/132; 427/343; 427/405; 427/419.1; 427/438
(58) Field of Search ................................. 427/554, 130, 427/131, 132, 123, 337, 343, 405, 419.1, 438, 129

(56) References Cited

U.S. PATENT DOCUMENTS

| | | | |
|---|---|---|---|
| 4,724,188 A | * 2/1988 | Saito et al. | 428/457 |
| 4,810,520 A | * 3/1989 | Wu | 427/8 |
| 5,108,781 A | * 4/1992 | Ranjan et al. | 427/53.1 |
| 5,405,646 A | * 4/1995 | Nanis | 427/131 |
| 5,431,959 A | 7/1995 | Kologe et al. | |
| 5,437,887 A | 8/1995 | Yarkosky et al. | |
| 5,714,207 A | * 2/1998 | Kuo | 427/555 |
| 6,106,927 A | * 8/2000 | Zhong et al. | 428/141 |

OTHER PUBLICATIONS

"Plating Rate of Electroless Nickel: Effect of Inorganic Salts", A.T. El Mallah et al., Metal Finishing, vol. 78, No. 7, Nov. 1978, pp. 62–64.

\* cited by examiner

*Primary Examiner*—Michael Barr
(74) *Attorney, Agent, or Firm*—McDermott, Will & Emery

(57) ABSTRACT

Electrolessly plated Ni—P amorphous coatings having an increased magnetic transformation temperature and ultra smooth surface are achieved employing a plating bath containing Al and/or Cu ions. Embodiments include electrolessly depositing an amorphous Ni—P coating exhibiting a magnetic transformation temperature of at least 330° C. proximate a laser textured protrusion.

12 Claims, 3 Drawing Sheets

ELECTROLESS NICKEL-PHOSPHOROUS COATINGS WITH HIGH THERMAL STABILITY

RELATED APPLICATION

This application claims priority from Provisional Application Ser. No. 60/129,308 filed Apr. 14, 1999, entitled "High Thermal Stable And Low Magnetic Nickel Substrate For Magnetic Storage Disks", the entire disclosure of which is hereby incorporated herein by reference.

This application is a continuation-in-part of application Ser. No. 09/122,761 filed on Jul. 27, 1998, now U.S. Pat. No. 6,106,927 the entire disclosure of which is hereby incorporated by reference herein.

TECHNICAL FIELD

The present invention relates to a method of manufacturing a magnetic recording medium having a non-magnetic substrate with an electrolessly deposited nickel-phosphorus (Ni—P) coating thereon. The present invention has particular applicability to high areal density magnetic recording media exhibiting low noise and high coercivity.

BACKGROUND ART

Nickel (Ni) platings, particularly electroless Ni platings or deposits, enjoy technological applicability in various industries, such as the electronic, oil and gas, aerospace, machinery, automobile and magnetic recording media industries. Electroless Ni is employed in the metal finishing industry for various metal substrates, including steel, copper, aluminum and alloys thereof. Conventional electrolessly deposited Ni—P platings exhibit desirable physical and chemical properties, such as hardness, lubricity, appearance, and corrosion resistance. An amorphous Ni—P plating is conventionally applied to a non-magnetic substrate, such as aluminum (Al) or an Al-alloy substrate in manufacturing magnetic recording media.

In operation, a magnetic disk is normally driven by the contact start-stop (CSS) method, wherein the head begins to slide against the surface of the disk as the disk begins to rotate and, upon reaching a predetermined high rotational speed, the head floats in air at a predetermined distance from the surface of the disk due to dynamic pressure effects caused by the air flow generated between the sliding surface of the head and the disk. During reading and recording operations, the transducing head is maintained at a controlled distance from the recording surface, supported on a bearing of air as the disk rotates. Upon terminating operation of the disk drive, the rotational speed of the disk decreases and the head begins to slide against the surface of the disk again and eventually stops in contact with and pressing against the disk. Thus, each time the head and disk assembly is driven, the sliding surface of the head repeats the cyclic operation consisting of stopping, sliding against the surface of the disk, floating in air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as "head crash." Thus, there are competing goals of reduced head/disk friction and minimum transducer flying height.

Conventional practices for addressing apparent competing objectives involve providing a magnetic disk with a roughened recording surface to reduce the head/disk friction by techniques generally referred to as "texturing." Convention texturing involves mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

It is recognized, however, that electroless metal plating, such as electroless Ni—P plating of a substrate, does not achieve a coating exhibiting a desired degree of surface smoothness, particularly the degree of smoothness necessary to satisfy the high areal recording density objectives of current magnetic recording media. In addition, the memory disk industry requires amorphous Ni—P coatings that remain substantially non-magnetic, i.e., that do not crystallize. The transformation of electrolessly deposited amorphous Ni—P coatings to the crystalline form during subsequent processing results in the formation of a thin magnetic Ni—P layer with an attendant interruption in the magnetic field, thereby rendering the magnetic storage disks non-functional. In addition, crystalline boundaries associated with magnetic Ni—P coatings provide high activity sites for chemical attack in a corrosive or moist environment.

The lower the intrinsic thermal stability of the Ni—P coating, the lower the temperature at which it converts to the crystalline magnetic form during subsequent processing at elevated temperatures. The conversion of paramagnetic Ni—P coatings to the magnetic form readily occurs in post plating processing, such as baking, texturing and sputter deposition. Moreover, during pre-sputter cleaning, the Ni—P layer undergoes selective dissolution of the nickel, thereby leading to a P-enriched surface, e.g., an elevation in the P content from about 12 wt. % to about 20 wt. %. As a result, the surface layer becomes crystallized at a lower temperature than the bulk of the layer, resulting in the formation of a surface magnetic layer during subsequent processing, e.g., sputter deposition. The low intrinsic thermal stability exacerbated by nickel depletion during cleaning and/or localized heating not only leads to surface magnetization but also alters the smoothness of the substrate surface leading to head crash. During conventional processing, the detection of magnetic nickel occurs at temperatures as low as 310° for 10 minutes at or near laser textured bumps.

There exists a need for methodology enabling the manufacture of magnetic recording media having a thermally stable Ni—P layer. There exists a particular need for methodology enabling the manufacture of magnetic recording media comprising a non-magnetic substrate having a paramagnetic amorphous Ni—P coating thereon which is thermally stable at sufficiently high temperatures to enable higher temperature sputter deposition for higher coercivity.

DISCLOSURE OF THE INVENTION

An advantage of the present invention is a method of electrolessly depositing an amorphous Ni—P coating exhibiting high thermal stability and having an ultra-smooth as-deposited surface.

According to the present invention, the foregoing and other advantages are achieved by a method of manufacturing a magnetic recording medium, the method comprising: electrolessly depositing an amorphous nickel-phosphorous (Ni—P) coating on a non-magnetic substrate employing a plating bath comprising aluminum (Al) and/or copper (Cu) ions in an effective amount to achieve an as-deposited average surface roughness (Ra) less than about 10 Å and a magnetic formation temperature not less than about 330° C.; and cleaning the Ni—P coating with an acidic agent having a pH less than about 4 or an alkaline agent having a pH greater than about 12 without any substantial depletion of nickel from the surface of the Ni—P coating and without lowering the magnetic formation temperature.

Embodiments of the present invention include laser texturing a Ni—P coated substrate at a temperature no less than about 330° C. without any substantial magnetic transformation of the amorphous Ni—P coating. Embodiments of the present invention further include cleaning the laser textured substrate with an acidic agent having a pH less than about 4 or an alkaline agent having a pH greater than about 12.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawing and description are to be regarded as illustrative in nature, and not as restrictive.

DESCRIPTION OF THE INVENTION

Figure 1:
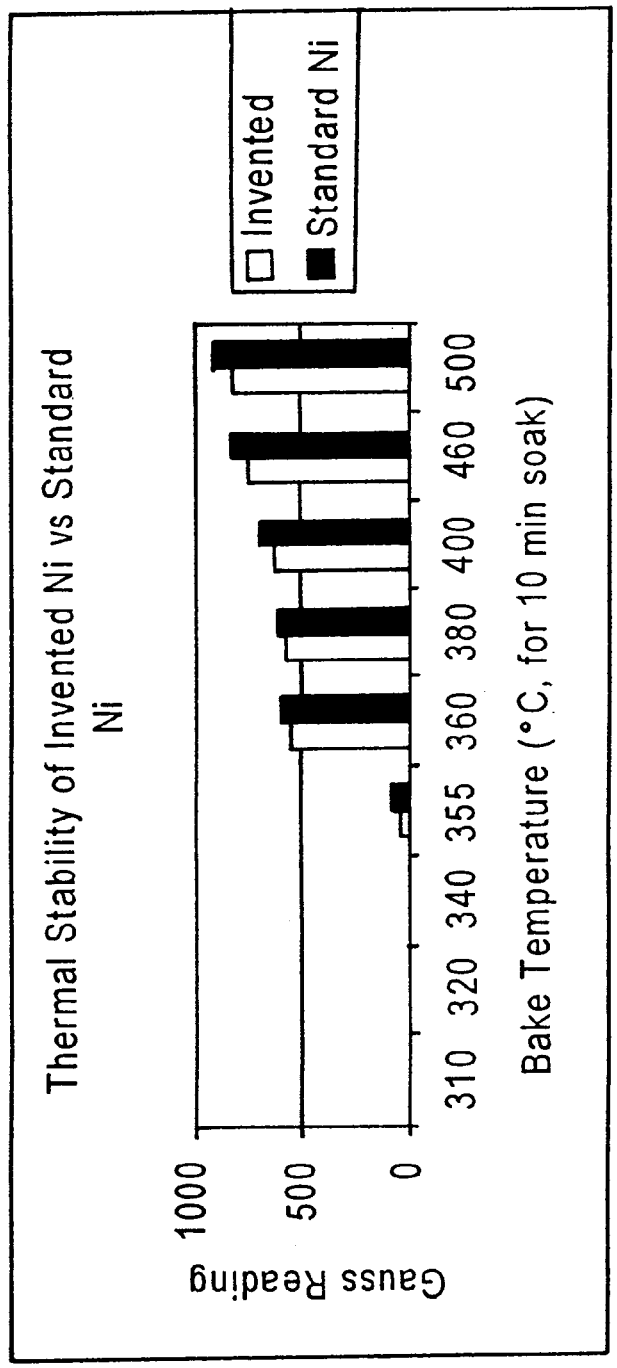
FIG. 1 illustrates the thermal stability of a Ni—P coating vis-à-vis a conventional Ni—P coating measured by VSM (Vibrating Sample Magnetometer).
Figure 1:
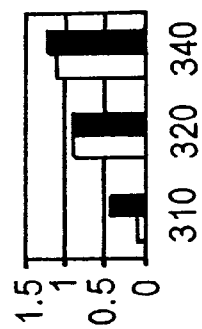

A limitation on the ability to manufacture magnetic recording media exhibiting high corrosion resistance and high coercivity for high aerial density recording is the relatively low intrinsic thermal stability of the amorphous Ni—P coating conventionally deposited on a non-magnetic substrate. A conventionally deposited Ni—P contains about 12 wt. % phosphorous and becomes crystallized when heated above a theoretical intrinsic thermal stability temperature, e.g.; at a temperature of about 350° C. for about 10 minutes. However, in actual manufacturing techniques, a surface layer of the electrolessly deposited amorphous Ni—P layer becomes crystallized at a significantly lower temperature, e.g., as when heated at 320° C. for about 10 minutes, due to the selective dissolution of nickel, i.e., nickel depletion, during conventional cleaning. Conventional laser texturing farther reduces the magnetic Ni formation temperature such that crystallization occurs when heated to a temperature of about 310° C. for about 10 minutes. The limitation of thermal stability in conventional electrolessly deposited amorphous Ni—P coatings require sputter deposition temperatures of about 310° C., thereby limiting the ability to achieve higher coercivities.

In patent application Ser. No. 09/122,761, now U.S. Pat. No. 6,106,927, methodology is disclosed for electrolessly depositing Ni coatings having an Ra less than about 30 Å, such as less than about 16 Å are also disclosed. Such ultra-smooth as-deposited electroless Ni coatings offer several technological advantages, such as significantly reducing subsequent polishing, reducing polishing cycles and cycle time, and increasing yield by at least 10%. The electroless deposition of Ni—P coatings having an as-deposited ultra-smooth surface enables and facilitates the manufacture of magnetic recording medium having high areal recording density, by enabling a reducing in the flying height of the head.

The invention disclosed in patent application Ser. No. 09/122,761 (U.S. Pat. No. 6,106,927) stems from the discovery that the incorporation of certain metal ions in a plating bath for electroless Ni deposition significantly enhances the smoothness of the as-deposited surface. These metal ions include Al and/or Cu ions. The metal ions can be incorporated in the electroless Ni plating bath in any of various forms, such as a salt. For example, it has been found suitable to introduce Al ions in the plating bath in the form of aluminum sulfate, e.g., $Al_2(SO_4)_3 \cdot 16H_2O$, and Cu ions in the form of copper sulfate ($CuSO_4$). Given the objectives and guidance of the present disclosure, the optimum amount of metal ions incorporated in the plating bath can easily be determined in a particular situation. For example, it has been found suitable to include Al ions in the plating bath at a concentration of about 0.1 to about 10 parts per million (ppm), e.g., about 3 to about 5 ppm. It was also found suitable to include Cu ions in the plating bath at a concentration of about 2 to about 10 ppm, such as about 5 to about 10 ppm, e.g., about 7 to about 10 ppm and about 7 to about 9 ppm. For example, $CuSO_4$ can be introduced into a plating bath at a concentration of about 17.6 ppm to achieve a Cu ion concentration of about 7 ppm.

Quite unexpectedly, it was found that the dramatic enhancement in as-deposited surface smoothness can be achieved by introducing Al and/or Cu ions into the plating bath at any time before or during plating. For example, Al and/or Cu ions can be introduced into the electroless Ni plating bath at any particular time before the end of plating, continuously during plating, or at multiple feeding times during plating. The Al and/or Cu ions can also be added to the Ni replenishment solution in a conventional electroless deposition system prior to plating. It was also unexpected that the advantages of the present invention stemming from the introduction of Al and/or Cu ions into the plating bath can be achieved independent of the original Ni—P nodule size.

The exact mechanism involved in the dramatic improvement in as-deposited surface smoothness achieved by the present invention is not known with certainty. During the initial nucleation phase of electroless deposition, the nucleation rate is primarily a function of surface tension which, in turn, depends upon other variables, such as pH, temperature, the chemical properties of the plating bath, and impurities therein. The growth rate is primarily a function of the concentration of plating ingredients, e.g., Ni and P, and the temperature. The Ni—P nodule size is dependent upon a balance of the nucleation rate and growth rate. It is believed that the advantages achieved by the present invention, which are independent of the original Ni—P nodule size, stem from activation of additional nodule sites by Al and/or Cu ions in lower areas between the nodules, or on the grind, scratches, or inside plating pits with larger surface areas.

Upon subsequent experimentation and investigation, it was unexpectedly found that the amorphous Ni—P coatings deposited by the electroless deposition technique disclosed in patent application Ser. No. 09/122,761 (now U.S. Pat. No. 6,106,927) exhibit a high intrinsic thermal stability with a Gauss reading reduced more than 50% compared to regular nickel coatings at a transition temperature of about 350° C. Advantageously, such electroless deposited amorphous Ni—P coatings with high thermal stability exhibit high corrosion resistance by shifting the Ecorr more than 25 Mv to the noble side, when tested by a potentio/galvanic tester in 0.1N $H_2SO_4$ solution. Thus, aside from having a Ra of less than about 20 Å, the Ni—P coatings also exhibited high chemical stability, thereby enabling the use of relatively severe cleaning solutions, such as an acid having a pH less than about 4, e.g., about 2 to 4, as well as an aggressive alkaline solution having a pH greater than 12, e.g., about 12 to 14, vis-à-vis the use of relatively mild clean agents, such as malic acid, which are slow acting and, hence, time consuming. The use of more aggressive cleaning solutions enables the production of cleaner components in a shorter period of time, thereby increasing yield and production through-put. In addition, the thermally stable Ni—P coatings enable subsequent processing at temperatures of at least 20° C. higher than those employed when processing conventional Ni—P coatings. For example, conventional Ni—P coatings exhibit a detectable magnetic nickel formation after laser texturing when exposed to a temperature of about 310° C. for about 10 minutes, and when exposed to a temperature of about 320° C. for about 10 minutes during sputter deposition of subsequent coatings. The Ni—P coatings in accordance with the present invention, however, can be laser textured at a temperature in excess of 310° C., e.g., about 310° C. to about 330° C., and enables an increase in the sputter deposition temperature of at least about 20° C. thereby making it possible to achieve higher coercivities.

The mechanism underpinning the advantageous increase in thermal stability of the inventive nickel Ni—P coatings is not known with certainty. However, it is believed that the controlled introduction of Al and/or Cu ions activate natural nucleation sites and control the nodule growth, such that the Ni—P coating is formed in a fine nodule size exhibiting a significantly more uniform microstructure and component distribution. The uniform structure and component distribution provide fewer heterogeneous crystal nucleation sites. Higher energy is required for homogeneous crystal transformation and intrinsic thermal stability is achieved. The microstructure and component uniformity also improve the corrosion resistance and suppress nickel depletion due to fewer localized galvanic cells. Thus, the combination of intrinsic thermal stability improvement and suppression of nickel depletion lead to an increase of at least 20° C. in the magnetic nickel transformation temperature. Thus, the intrinsic bulk crystalline temperature can be raised from about 320° C. to about 340° C.

FIG. 1 illustrates the improved thermal stability of the inventive Ni—P coatings vis-à-vis conventional Ni—P coating. It should be apparent from FIG. 1 that the Gauss reading was lowered more than 50% as to the inventive Ni—P coatings at a transition temperature of 355° C. A lower Gauss reading was maintained throughout the entire temperature reading.

EXAMPLES

Several conventional plating baths were employed to electrolessly deposit Ni—P coatings on Al substrates. The coatings were there heated to different temperatures and examined for a magnetic zone. The baths and temperatures are set forth in Table 1 below. The Fidelity plating bath chemistry was obtained from Fidelity Chemical Products Corporation located in Newark, N.J., while the Enthone chemistry plating bath was obtained by Enthone OMI Inc. located in Pleasanton, Calif.

TABLE 1

Magnetic Ni zone around laser bumps for different plating chemicals

| Group # | Ni Chemistry | Batch # | 320° C. | 330° C. | 340° C. | 350° C. |
| --- | --- | --- | --- | --- | --- | --- |
| 1 | Fidelity | Run #2 | No | <0.1 cm | 1 cm | 1.5 cm |
| 2 | Fidelity | Run #2 | <0.1 cm | 1 cm | 1.5 cm | 2 cm |
| 3 | Fidelity | Run #2 | No | 0.2 | 1 cm | 2 cm |
| 4 | Enthone 4692 | Run #3 | No | 0.2 cm | 1.5 cm | 2.5 cm |
| 5 | Enthone 6450 | Run #2 | 0.2 cm | 0.2 cm | 2 cm | 3 cm |
| 6 | ASNi (Invented) | Run #2 | No | No | No | Yes |

Figure 2A:
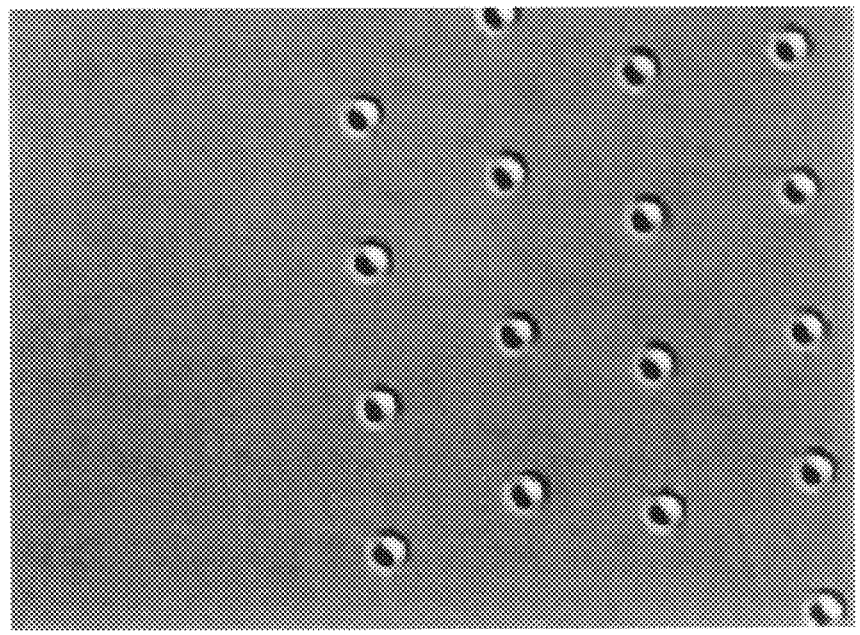
FIG. 2a is a photomicrograph of a substrate in accordance with the present invention.
Figure 2B:
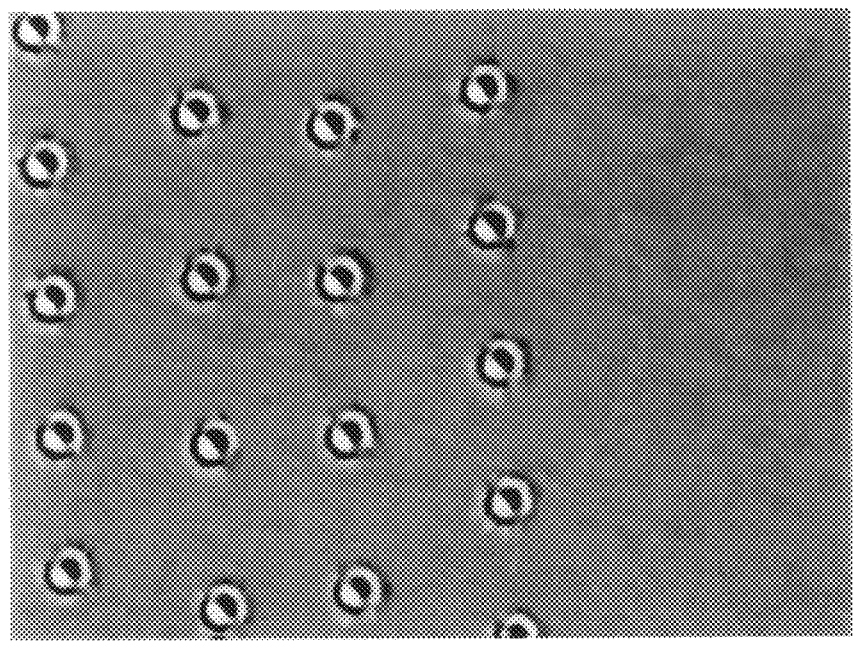
FIGS. 2b–2d illustrate magnetic zone formation on comparison substrates.
Figure 2C:
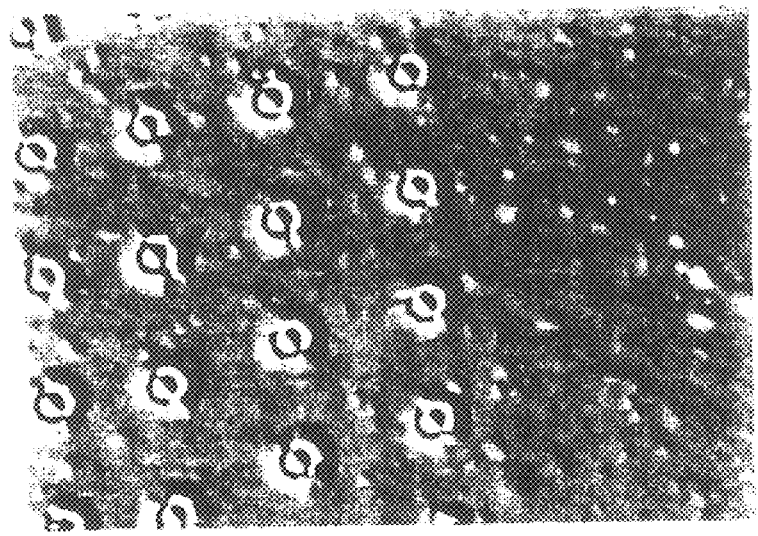
Figure 2D:
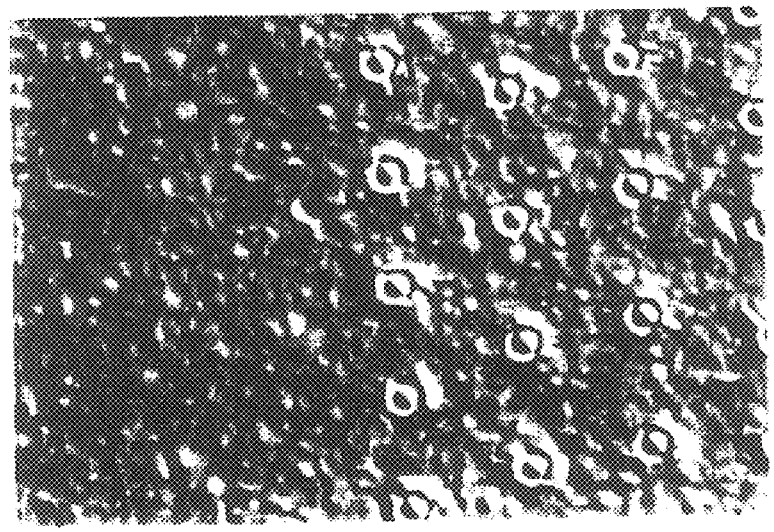

FIG. 2a is a photomicrograph of the inventive electrolessly deposited Ni—P coating indicating that no magnetic zone was found after laser texturing at 340° C. for 10 minutes. However, as shown in FIGS. 2b, 2c and 2d, the Ni—P coatings deposited from the conventional plating baths indicated the formation of a magnetic zone employing a Fidelity 4355 and Enthone 4692 after laser texturing at a temperature of 340° C. for 10 minutes. The fully crystallized surface of Ni—P electrolessly deposited from Enthone 4692 and laser textured at 350° C. for 10 minutes is shown in FIG. 2d and exhibited a fully crystallized surface.

The electroless Ni plating baths employed in the present invention can be any conventional electroless Ni plating composition, such as those disclosed in U.S. Pat. No. 5,141,778, U.S. Pat. No. 4,567,066 and those disclosed in the previously mentioned Hajdu et al. publication entitled "The Electroless Nickel Process For Memory Disks", the entire disclosures of which are hereby incorporated herein by reference. In addition, the substrate can be initially zincated as disclosed in U.S. Pat. No. 5,141,778 and U.S. Pat. No. 4,567,066.

Electroless Ni plating compositions generally comprise four ingredients dissolved in a solvent, typically water. These ingredients include: (1) a source of Ni ions; (2) a reducing agent, such as a hypophosphite or an amine borane; (3) an acid or hydroxide pH adjuster to provide a suitable pH; and (4) a complexing agent for metal ions sufficient to prevent their precipitation in solution. Such suitable complexing agents are well known in the art. Accordingly, upon employing a hypophosphite as the reducing agent, the deposit will contain Ni and P. On the other hand, if an amine borane is employed, the deposit will contain Ni and boron.

Ni ions can be provided by employing a suitable soluble salt, such as Ni—P, nickel chloride, nickel acetate and mixtures thereof. The concentration of Ni in solution can vary widely. Ni concentrations include about 0.1 to about 100 g/l, such as about 2 to about 50 g/l, e.g., about 2 to about 10 g/l.

The reducing agent employed, particularly in manufacturing a magnetic recording medium, is typically hypophosphite ion supplied to the bath by any suitable source, such as sodium, potassium, ammonium and nickel hypophosphite. Other reducing agents, such as amine boranes, borohydrides and hydrazine, can also suitably be employed. The concentration of the reducing agent is generally in excess of the amount sufficient to reduce the Ni in the bath.

The plating bath can be acid, neutral or alkaline, and the acid or alkaline pH adjuster can be selected from a wide range of materials, such as ammonium hydroxide, sodium hydroxide, and hydrochloric acid. The pH of the bath may range from about 2 to about 12, such as about 4 to about 5, e.g., about 4.43 to about 4.83. The complexing agent can be selected from a wide variety of materials, such as lactic acid, malic acid, and those containing anions such as acetate, citrate, glycolate, pyrophosphate, and mixtures thereof. Ranges for the complexing agent, based on the anion, can vary widely, such as about I to about 300 g/l, e.g., about 5 to about 50 g/l.

The electroless Ni plating baths employed in the present invention can also contain other conventional additives, such as buffering agents, bath stabilizers, rate promoters, brighteners, etc. Stabilizers such as lead, antimony, mercury, tin and oxy compounds, such as iodate, can also be employed. A suitable bath can be formed by dissolving the ingredients in water and adjusting the pH to the desired range.

In accordance with embodiments of the present invention, the Ni—P coatings can be applied to a thickness of about 80 microinches ($\mu$") to about 600 $\mu$". Embodiments of the present invention include an immersion time about 10 minutes to about 2.5 hours to achieve a thickness of about 80 $\mu$" to about 600 $\mu$". A temperature range of about 25° C. to boiling, e.g., about 100° C., can be employed, e.g., about 30° C. to about 95° C.

Magnetic recording media in accordance with the present invention can comprise any conventional substrate, such as an Al or an Al alloy substrate, or a glass, ceramic, glass-ceramic or polymeric substrate. The present invention can be implemented employing any of the various seedlayers, underlayers, magnetic layers and lubricant topcoats unconventionally employed in manufacturing magnetic recording media. For example, embodiments of the present invention comprise the use of a Cr or Cr alloy underlayer or underlayers, Co-alloy magnetic layers and PFPE lubricants for enhance durability.

The present invention stems from the discovery that the introduction of Al and/or Cu ions into a electroless Ni plating bath or before electroless deposition, e.g., at a predetermined time during or at a plurality of predetermined times during deposition enables electroless deposition of Ni coatings with high thermal stability having an as-deposited Ra less than about 30 Å, such as less than about 25 Å, e.g., less than about 16 Å, independent of the original nodule size. Ultra smooth electroless nickel platings with high thermal stability according to the present invention can be deposited on any of various substrates, including those on which Ni has previously been electrolessly deposited. The present invention advantageously increases production through-put and reduces costs by reducing the polish cycle time as well as number of polishing steps, and by reducing the plating defects and increasing yield. The electroless Ni coatings deposited in accordance with the present invention exhibit increased uniformity thereby providing greater protection for the underlying substrate, reduced chemical corrosion and improved wear resistance. The present invention enjoys particular applicability in manufacturing high areal density magnetic recording media.

The electrolessly deposited amorphous Ni—P coatings in accordance with the present invention exhibiting high thermal stability enjoy utility in the manufacture of any various types of magnetic recording media. The high thermal stability exhibited by the inventive Ni—P coatings enable aggressive cleaning techniques to provide a cleaner product with increased production through-put. The high thermal stability of the Ni—P coatings exhibit superior corrosion resistance and enable higher processing temperatures, e.g., about 320° C. to 340° C., thereby enabling more effective laser texturing as well as high temperature sputter deposition of coatings for higher coercivity.

Only certain embodiments of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A method of manufacturing a magnetic recording medium, the method comprising:

electrolessly depositing an amorphous nickel-phosphorous (Ni—P) coating on a non-magnetic substrate employing a plating bath containing aluminum (Al) and/or copper (Cu) ions in an effective amount to achieve an as-deposited average surface roughness (Ra) less than about 10 Å and a magnetic formation temperature not less than about 320° C.; and cleaning the Ni—P coating with an acidic agent having a pH less than about 4 or an alkaline agent having a pH greater than about 12 without any substantial depletion of nickel from the surface of the Ni—P coating and without lowering the magnetic transformation temperature.

2. The method according to claim 1, further comprising laser texturing the Ni—P coated substrate at a temperature no less than about 330° C. without any substantial magnetic transformation of the amorphous Ni—P.

3. The method according to claim 2, comprising laser texturing the Ni—P coated substrate at a temperature no less than about 340° C.

4. The method according to claim 2, further comprising cleaning after laser texturing the substrate with an acidic agent having a pH less than about 4 or an alkaline agent having a pH greater than about 12.

5. The method according to claim 1, wherein the magnetic formation temperature is not less than about 340° C.

6. The method according to claim 1, wherein the Ni—P coating contains about 12 wt. % phosphorous and the concentration of phosphorous does not undergo any substantial change throughout subsequent processing to complete the magnetic recording medium.

7. The method according to claim 1, further comprising:
   depositing an underlayer on the Ni—P coating;
   depositing a magnetic layer on the underlayer; and
   depositing a protective overcoat on the magnetic layer.

8. The method according to claim 1, wherein the bath contains Al ions at a concentration of about 0.1 to about 10 parts per million.

9. The method according to claim 8, wherein the bath contains Al ions at a concentration of about 3 to about 5 parts per million.

10. The method according to claim 1, wherein the bath contains Cu ions at a concentration of about 2 to about 10 parts per million.

11. The method according to claim 10, wherein the bath contains Cu ions at a concentration of about 5 to about 7 parts per million.

12. The method according to claim 1, further comprising depositing at least one zincate coating on the substrate, and electrolessly depositing the Ni—P coating on the at least one zincate coating.

* * * * *